United States Patent [19]
Okamura

[11] Patent Number: 6,035,135
[45] Date of Patent: Mar. 7, 2000

[54] CONTROL OF FLASH DEVICE INCLUDED IN OR CONNECTED TO IMAGE SENSING DEVICE

[75] Inventor: Satoshi Okamura, Yokohama, Japan

[73] Assignee: Canon Kabushiki Kaisha, Tokyo, Japan

[21] Appl. No.: 09/130,924

[22] Filed: Aug. 6, 1998

[30] Foreign Application Priority Data

Aug. 21, 1997 [JP] Japan .................................. 9-224896
Sep. 19, 1997 [JP] Japan .................................. 9-255422

[51] Int. Cl.⁷ ...................................................... G03B 15/04
[52] U.S. Cl. .............................. 396/61; 396/159; 348/371
[58] Field of Search .............................. 396/61, 159, 161, 396/162, 164, 155, 165; 348/370, 371

[56] References Cited

U.S. PATENT DOCUMENTS

4,965,620 10/1990 Takagi et al. ............................ 396/161
5,231,447 7/1993 Takagi ...................................... 396/61
5,892,987 4/1999 Ohmori et al. ........................... 396/61

*Primary Examiner*—W. B. Perkey
*Attorney, Agent, or Firm*—Morgan & Finnegan, LLP

[57] ABSTRACT

An image sensing apparatus having or capable of connecting to a flash device. First, an object is illuminated in predetermined radiant by controlling the flash device, and light reflected by the object is converted into an electric image signal and outputted. A plurality of photometric values are obtained by a plurality of photometry circuits, which use different photometry methods, on the basis of the image signal. Then, property of the object is determined on the basis of the image signal and the photometric values, and one of the plurality of photometry circuits is selected on the basis of the determined property of the object. Finally, radiant quantities of the flash device is controlled on the basis of a photometric value outputted from the photometry circuit, and an image of the object is sensed.

33 Claims, 8 Drawing Sheets

CONTROL OF FLASH DEVICE INCLUDED IN OR CONNECTED TO IMAGE SENSING DEVICE

BACKGROUND OF THE INVENTION

The present invention relates to an image sensing apparatus using a flash device and, more particularly to, an image sensing apparatus, such as an electronic camera, having an image sensing device.

It is necessary to use a flash device for sensing a low luminance object by an image sensing apparatus, such as an electronic camera. As a method of controlling a flash device, a method of causing the flash device to flash toward an object to be sensed with predetermined radiant quantities, and controlling radiant quantities on the basis of a quantity of reflected light from the object for sensing an image of the object has been suggested.

A conventional example is explained below.

Figure 8:
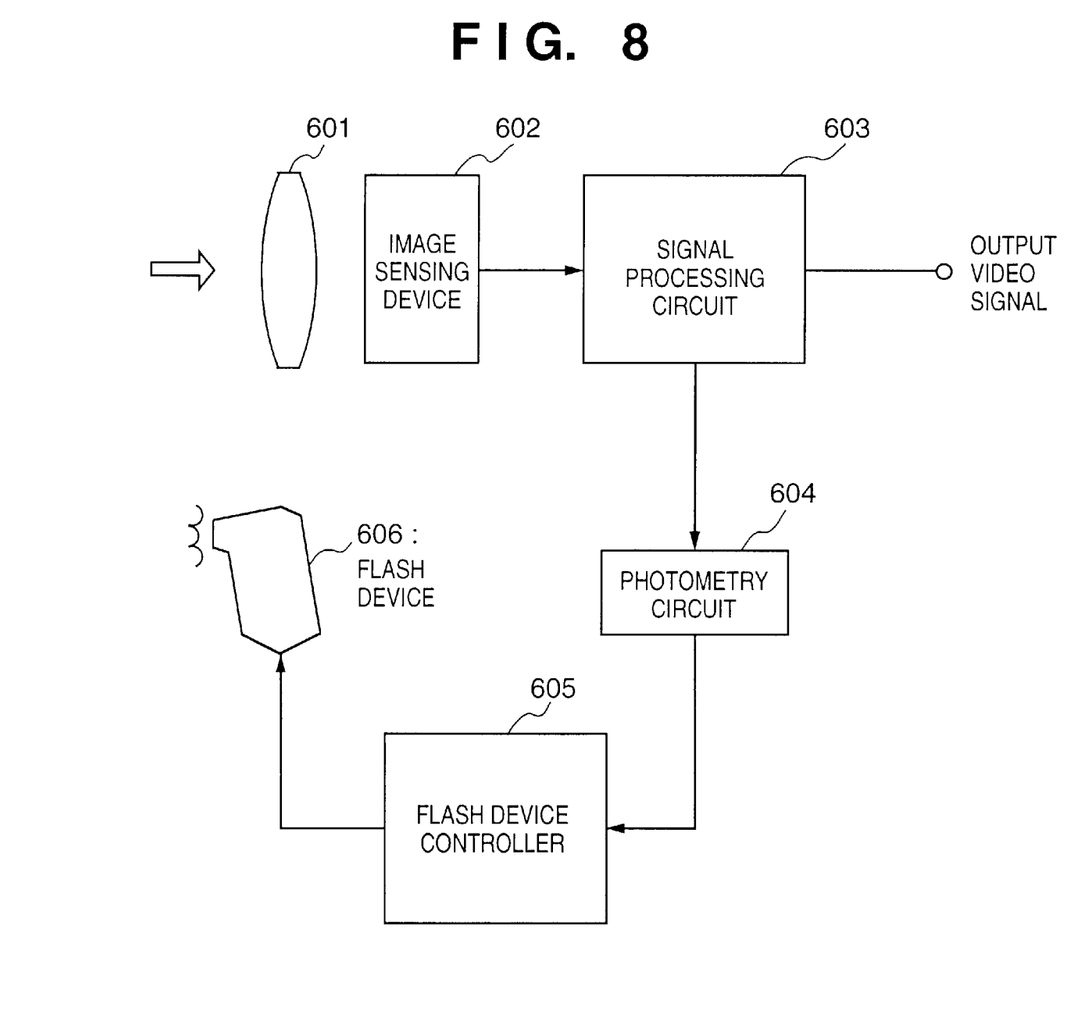
FIG. 8 is a block diagram illustrating a configuration of an image sensing system of a conventional electronic camera.

FIG. 8 is a block diagram illustrating an image sensing system of a conventional electronic camera. In FIG. 8, reference numeral 601 denotes a focusing lens; 602, an image sensing device for converting incoming light into electric signals; 603, a signal processing circuit for generating a luminance signal and color signals from the electric signals generated by the image sensing device 602; 604, a photometry circuit for generating a photometric value of a scene on the basis of the luminance signal generated by the signal processing circuit 603; 606, a flash device for illuminating an object; and 605, a flash device controller for controlling radiant quantities of the flash device 606 using the photometric value generated by the photometry circuit 604.

In the conventional electronic camera as described above, light from the object incidents on the image sensing device 602 via the lens 601 and applied with photoelectric conversion by the image sensing device 602, and a video signal is generated by the signal processing circuit 603. Further, the photometric value is generated by the photometry circuit 604 on the basis of a luminance signal included in the video signal. According to a method, the flash device controller 605 controls the flash device 606 to flash, at least once, in known radiant quantities (called "pre-radiating operation", hereinafter) in advance of sensing an image.

The quantity of reflected light from the object in the pre-radiating operation is outputted as a photometric value from the photometry circuit 604, and the flash device controller 605 calculates radiant quantities which the object is properly illuminated in sensing the object on the basis of the photometric value obtained in the pre-radiating operation and controls the radiant quantities of the flash device 606. In this manner, it is possible to sense the object with proper exposure.

In the conventional image sensing apparatus as described above, in a case where center-weighted average photometry for performing photometry mainly on a central portion of a scene, for instance, is adopted as a photometry method, when a main object exists at a distance from the image sensing apparatus, a photometric value obtained by the photometry circuit sometimes results in a small value due to effects of dark areas around the main object. As a result, the main object would not be sensed with proper exposure.

Whereas, in a case where the photometry circuit performs peak photometry, when the distance to the object is long, it is possible to control the flash device so as to illuminate the object properly on the basis of a photometric value obtained by performing the peak photometry since, in the peak photometry, photometric values are obtained for a plurality of divided areas of a scene and the maximum photometric value among the photometric values is outputted from the photometry circuit. Therefore, the dark area around the object practically does not affect the peak photometry. However, when the distance between the image sensing apparatus and the object is short, since the radiant quantities of the flash device are controlled on the basis of the maximum photometric value in the divided areas of the scene in the peak photometry, the object may not be sensed with proper exposure.

SUMMARY OF THE INVENTION

The present invention has been made in consideration of the above situation, and has as its object to provide an image sensing apparatus capable of sensing an object while properly controlling radiant quantities of a flash device regardless object property.

According to the present invention, the foregoing object is attained by providing an image sensing apparatus having or capable of connecting to a flash device comprising an image sensing device for performing photoelectric conversion of light from an object and outputting an image signal; a plurality of photometry means for obtaining and outputting photometric values using different photometry methods on the basis of the image signal outputted by the image sensing device; property determination means for determining property of the object; a selector for selecting one of the plurality of photometry means on the basis of the property of the object determined by the property determination means; and control means for controlling radiant quantities of the flash device on the basis of a photometric value outputted from the photometry means selected by the selector.

Further, the foregoing object is also attained by providing a control method for controlling an image sensing apparatus having or capable of connecting to a flash device, the method comprising an image sensing step of performing photoelectric conversion of light from an object and outputting an image signal; a photometry step of obtaining and outputting a plurality of photometric values using a plurality of photometry methods on the basis of the image signal outputted in the image sensinstep; a property determination step of determining property of the object; a selection step of selecting one of the plurality of photometric values outputted in the photometry step on the basis of the property of the object determined in the property determination step; and a control step of controlling radiant quantities of the flash device on the basis of the photometric value selected in thee selection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

The first embodiment is explained below with reference to drawings.

Figure 1:
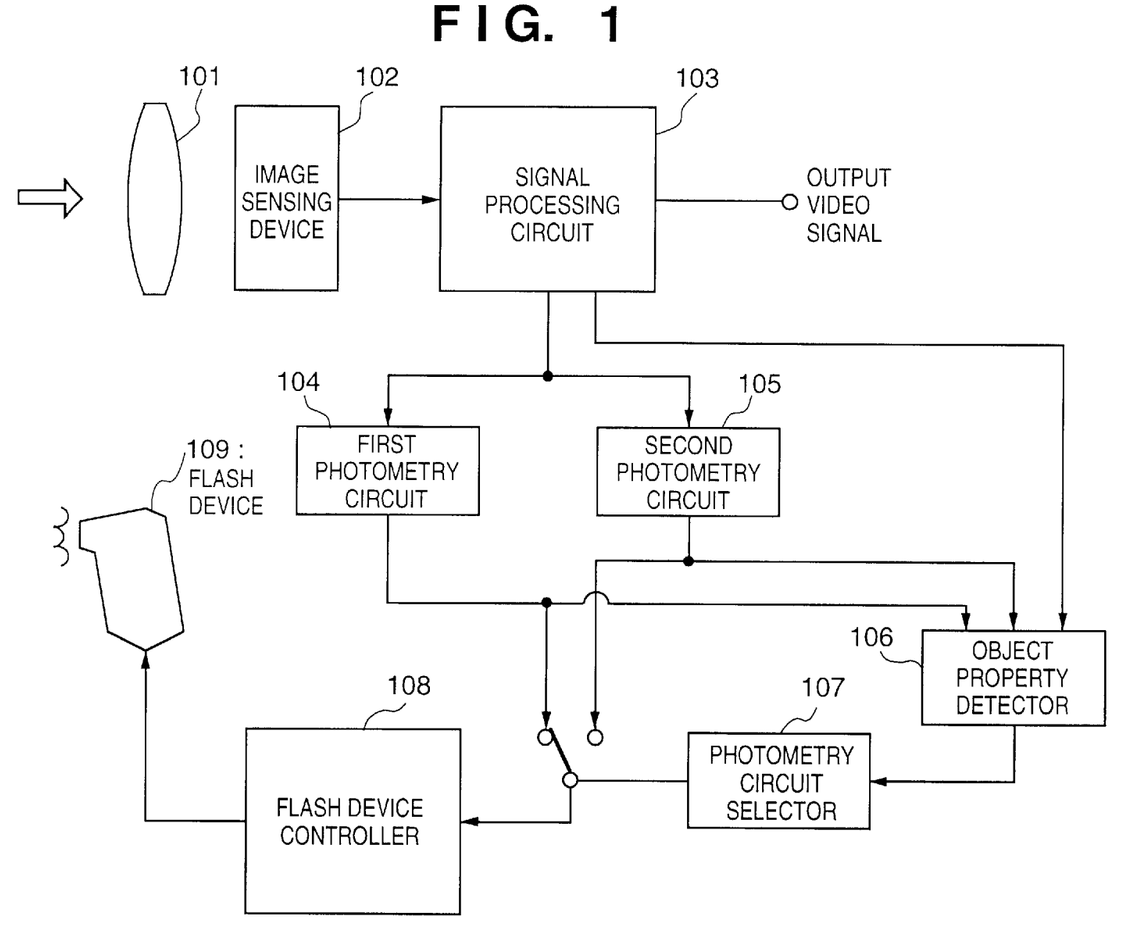
FIG. 1 is a block diagram illustrating a main configuration of an electronic camera having or capable of connecting to a flash device according to a first embodiment of the present invention.

FIG. 1 is a block diagram illustrating a main configuration of an electronic camera having or capable of connecting to a flash device according to the first embodiment of the present invention. In FIG. 1, reference numeral 101 denotes a focusing lens; 102, an image sensing device for converting incoming light into electric signals; 103, a signal processing circuit for generating a luminance signal and color signals from the electric signals generated by the image sensing device 102; 104, a first photometry circuit for generating a photometric value of a scene on the basis of the luminance signal generated by the signal processing circuit 103; 105, a second photometry circuit for generating a photometric value of the scene on the basis of the same luminance signal used by the first photometry circuit 104 by performing a different photometry method; 107, a photometry circuit selector for switching between the first photometry circuit 104 and the second photometry circuit 105; 106, an object property detector for detecting property of an object and outputting a detected result to the photometry circuit selector 107; 109, a flash device for illuminating the object; and 108, a flash device controller for controlling radiant quantities of the flash device 109 using the photometric value generated by either the first or second photometry circuit 104 or 105 selected by the photometry circuit selector 107.

In the electronic camera as described above, light from the object incidents on the image sensing device 102 via the lens 101 and applied with photoelectric conversion by the image sensing device 102, and a video signal is generated by the signal processing circuit 103. Further, photometric values are generated by the first and second photometry circuits 104 and 105 on the basis of a luminance signal included in the video signal.

Figure 3A:
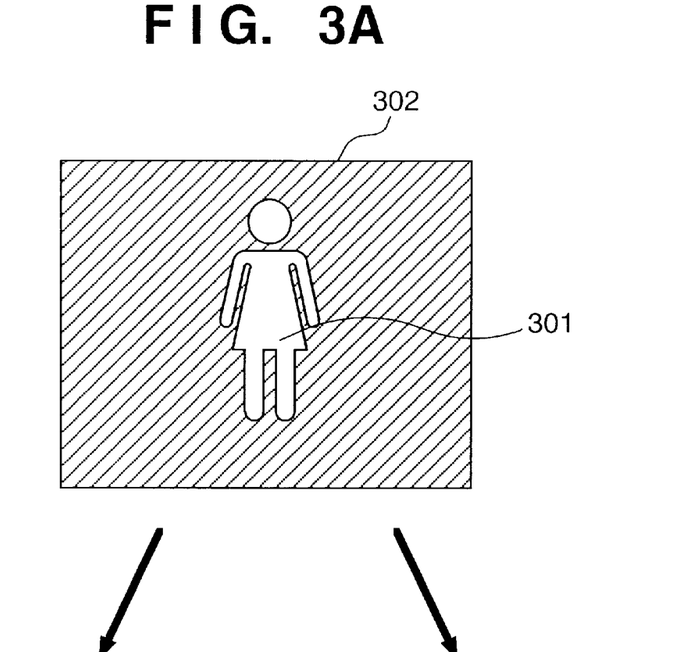
FIGS. 3A to 3C are explanatory views showing different photometry methods.
Figure 3B:
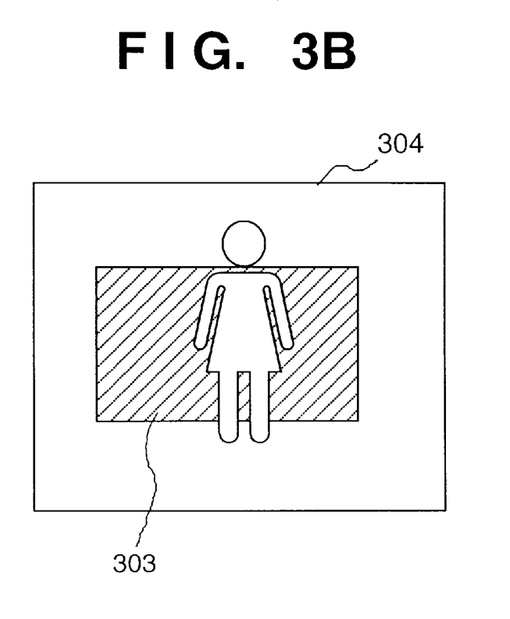
Figure 3C:
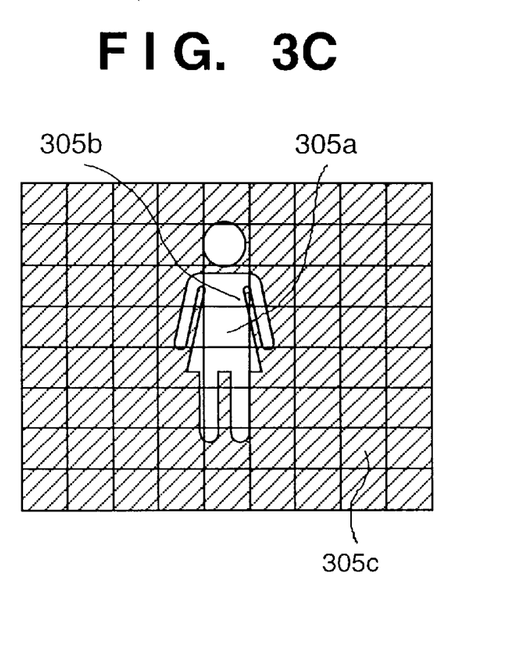

Photometry methods used in the first photometry circuit 104 and the second photometry circuit 105 will be explained below with reference to FIGS. 3A to 3C. FIGS. 3A to 3C are explanatory views showing different photometry methods. In FIG. 3A, reference numeral 301 denotes a main object and reference numeral 302 denotes a background image. In FIG. 3B, reference numeral 303 denotes a central area and reference numeral 304 denotes a peripheral area used in the center-weighted means photometry. Further, in FIG. 3C, reference numerals 305a, 305b and 305c denote examples of divided areas of a scene used in peak photometry.

The center-weighted average photometry is, as shown in FIG. 3B, to obtain photometric values of the central area 303 and the peripheral area 304, and weight the obtained photometric values differently so as to put more weight on the central area 303 than the peripheral area 304. In the first embodiment, the first photometry circuit 104 performs the center-weighted average photometry.

The peak photometry, as shown in FIG. 3C, divides a scene into a plurality of small areas, obtains photometric value of each of the plurality of small areas, and outputs the maximum photometric value. In the first embodiment, the second photometry circuit 105 performs the peak photometry.

Next, operation for controlling radiant quantities of the flash device 109 in the first embodiment is explained with reference to a flowchart in FIG. 2.

First, the flash device controller 108 controls the flash device 109 to flash with predetermined radiant quantities at least once (pre-radiating operation) in step S101. Then in step S102, the object property detector 106 detects property of the object, such as a difference component of a photometric value, obtained in the pre-radiating operation, from which an external light component is eliminated. Detected information on the property of the object is outputted to the photometry circuit selector 107.

In step S103, the photometry circuit selector 107 selects the first photometry circuit 104 as a default. Then in step S104, the photometry circuit selector 107 checks whether or not the difference component of the photometric value obtained as a result of the pre-radiating operation is greater than a predetermined value from the detected information. The reason for checking the difference component of the photometric value is that it is possible to know that the object is at a distance from the electronic camera if the value of the difference component is small since a small part of the light radiated by the flash device 109 would be reflected by the object and received by the image sensing device 102. Similarly, it is possible to know that the object is near the electronic camera if the value of the difference component is large since a large part of the light radiated by the flash device 109 would be reflected by the object and received by the image sensing device 102.

If the difference component is greater than the predetermined value (YES in step S104), then the selection of the first photometry circuit 104 is determined. Whereas, if the difference component is equal or smaller than the predetermined value (NO in step S104), namely, if the amount of light reflected by the object does not reach the predetermined value, the photometry circuit selector 107 selects the second photometry circuit 105 in step S105. The flash device controller 108 controls radiant quantities of the flash device 109 using the photometric value outputted from the selected photometry circuit so that the object is sensed with proper exposure in step S106.

In the first embodiment, the first photometry circuit 104 performs the center-weighted average photometry and the second photometry circuit 105 performs the peak photometry, as described above. If the distance to the object 301 is great and the background image 302 is dark, when the amount of light reflected by the object 301 is less than a predetermined value, the center-weighted average photometry is greatly affected by the dark area around the object undesirably, and radiant quantities would not be controlled properly for illuminating the object to be sensed with proper exposure.

Therefore, the photometry circuit selector 107 selects the second photometry circuit 105 and control of the radiant quantities is performed on the basis of the photometric value obtained in the peak photometry. When the reflectance of the main object 301 is roughly uniform, the photometric value of the area 305a is greater than that of the area 305b, and the photometric value of the area 305b is greater than that of the area 305c, since the area of the main object 301 in the respective divided areas 305a, 305b and 305c decrease in the described order. Further, since the large part of the area 305a is occupied by the main object 301 and the amount of reflected light in the pre-radiating operation would be the largest, the photometric value of the area 305a would have the maximum photometric value; therefore, the second photometry circuit 105 would output the photometric value of the area 305a. Thus, by extracting the area of the main object corresponding to the maximum photometric value, it is possible to reduce effects of the dark peripheral areas around the main object, thereby it is possible to perform control of radiant quantities in high precision.

Figure 2:
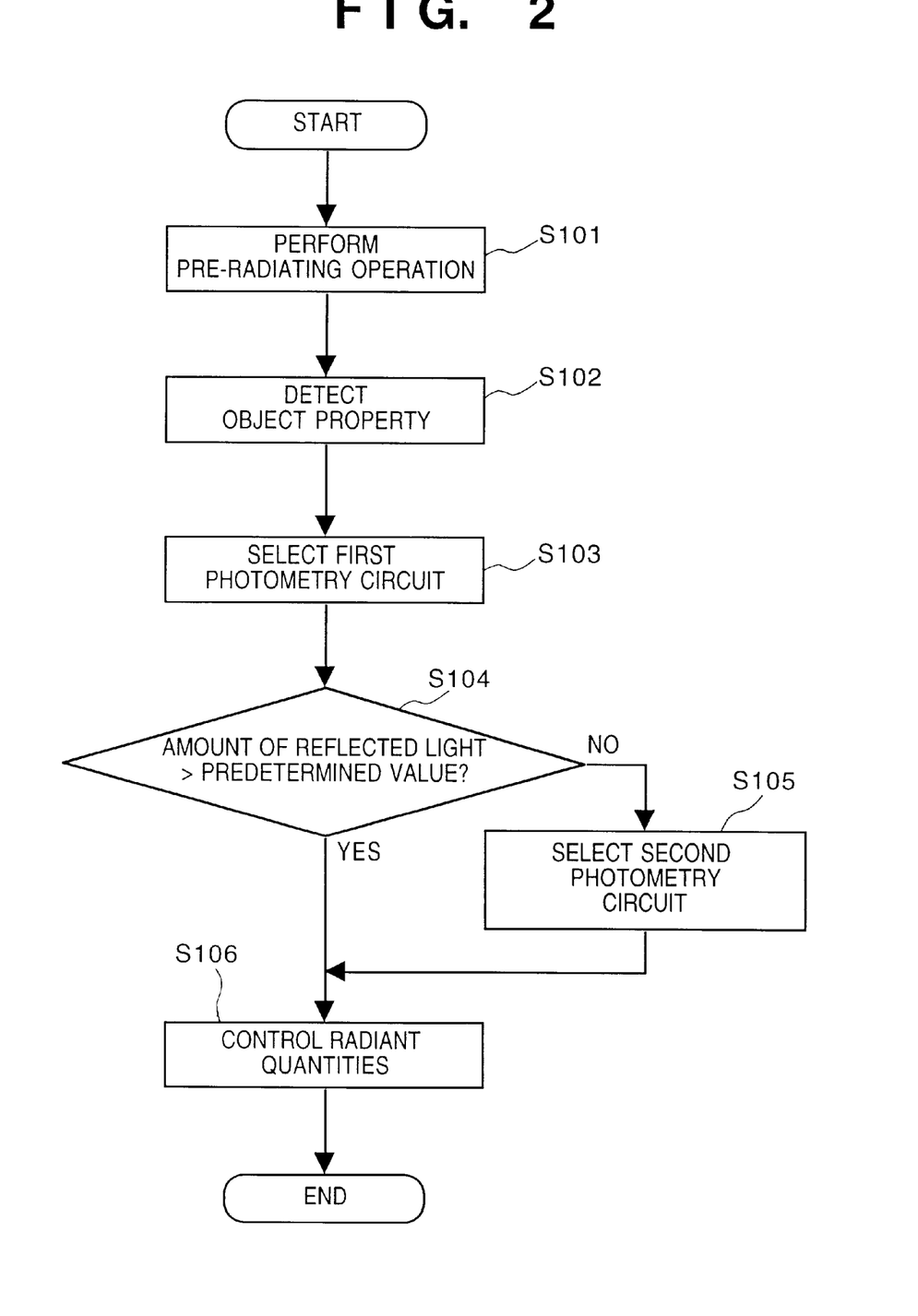
FIG. 2 is a flowchart showing a control operation of radiant quantities according to the first embodiment.

Note, in the first embodiment, the first photometry circuit 104 is selected first as a default, as shown in the flowchart in FIG. 2, however, the present invention is not limited to this. It is also possible to select the second photometry circuit 105 as a default in step S103. In this case, whether or not the difference component is equal or less than a predetermined value is checked in step S104, and if it is not, the first photometry circuit 105 is selected in step S105.

Further, the first photometry circuit 104, the second photometry circuit 105, the object property detector 106, the photometry circuit selector 107, and the flash device controller 108 may be physically implemented, software implemented, or a combination thereof, as long as they have the functions as described above.

According to the first embodiment as described above, by changing photometry method depending upon an amount of reflected light from an object in pre-radiating operation, i.e., property of the object in the first embodiment, it is possible to properly control radiant quantities of a flash device and sense the object in proper exposure comparing to a configuration using only one photometry circuit.

<Second Embodiment>

Figure 4:
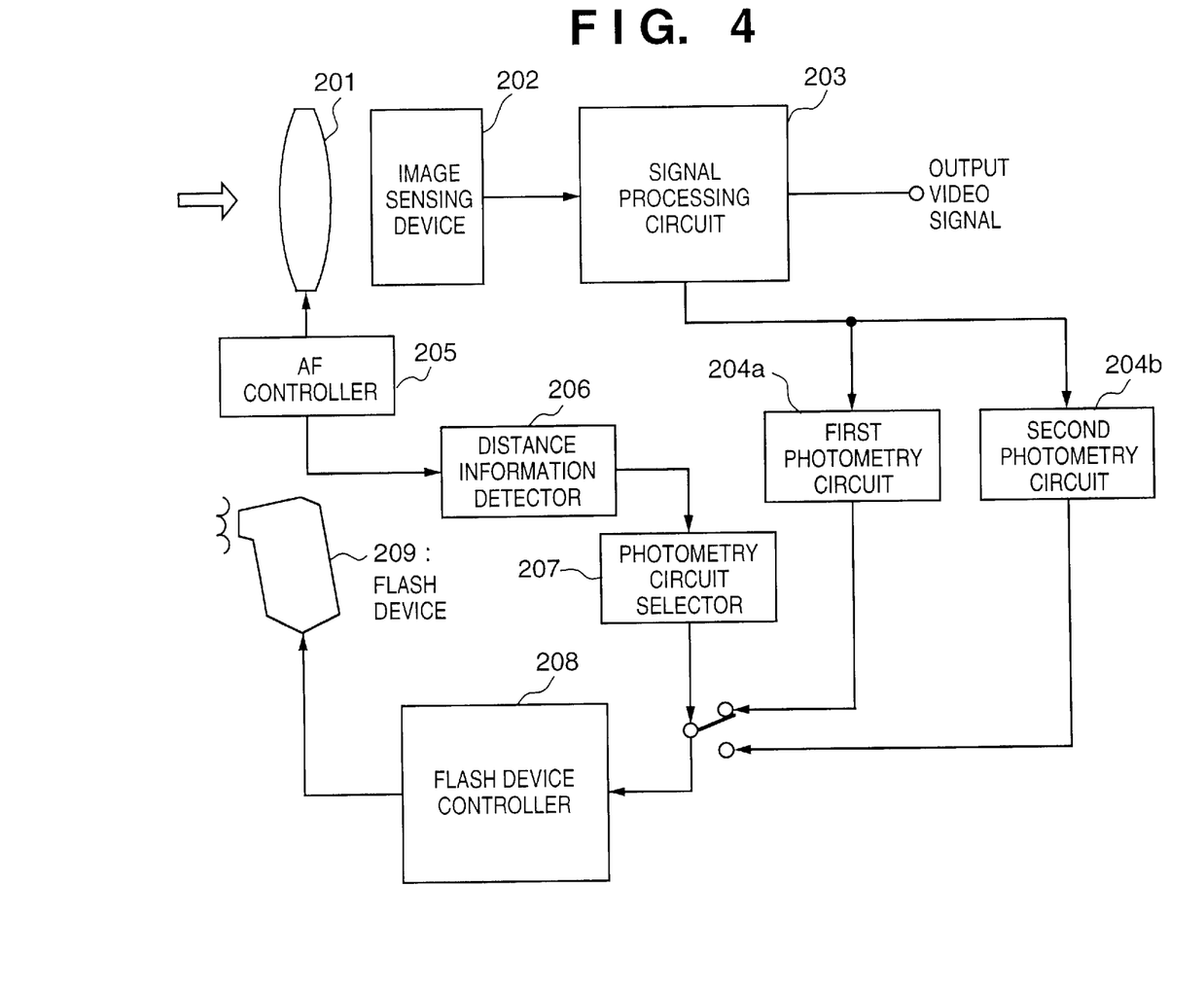
FIG. 4 is a block diagram illustrating a main configuration of an electronic camera having or capable of connecting to a flash device according to a second embodiment of the present invention.

Next, the second embodiment is explained with reference to drawings. FIG. 4 is a block diagram illustrating a main configuration of an electronic camera having or capable of connecting to a flash device, similarly to FIG. 1, according to the second embodiment of the present invention.

In FIG. 4, reference numeral 201 denotes a focusing lens for converging light from an object; 202, an image sensing device for converting incoming light, passing through the lens 201, into electric signals; 203, a signal processing circuit for generating a luminance signal and color signals from the electric signals generated by the image sensing device 202; 204a, a first photometry circuit for generating a photometric value of a scene in a predetermined photometry method on the basis of the luminance signal generated by the signal processing circuit 203; and 204b, a second photometry circuit for generating a photometric value of the scene on the basis of the same luminance signal used by the first photometry circuit 204a by performing a different photometry method. Similarly to the first embodiment, the first photometry circuit 204a adopts the center-weighted average photometry to output a mean photometric value of a scene where a central portion is weighted, and the second photometry circuit 204b adopts the peak photometry to measure photometric values of a plurality of divided areas of a scene and outputs the maximum photometric value (See FIGS. 3A to 3C).

Further, reference numeral 205 denotes an automatic focusing (AF) controller for performing automatic focusing by controlling the lens 201 to focus the light from the object on the image sensing device 202, and outputs information on the automatic focusing operation as a control signal; 206, a distance information detector for detecting information on the distance from the electronic camera to the object (distance information) on the basis of the control signal outputted from the AF controller 205; 207, a photometry circuit selector for switching between the first photometry circuit 204a and the second photometry circuit 204b on the basis of the detected distance information; 209, a flash device for illuminating the object; and 208, a flash device controller for controlling radiant quantities of the flash device 209 using the photometric value generated by either the first or second photometry circuit 204a or 204b selected by the photometry circuit selector 207. Note, any kind of configuration capable of realizing automatic focusing and outputting information on the automatic focusing operation may be used as the AF controller 205 in the second embodiment.

In the electronic camera as described above, similarly to that shown in FIG. 1 explained in the first embodiment, light from the object incidents on the image sensing device 202 via the lens 201 and applied with photoelectric conversion by the image sensing device 202, and a video signal is generated by the signal processing circuit 203. Further, the photometric values are generated by the first and second photometry circuits 204a and 204b using respective photometry methods on the basis of a luminance signal included in the video signal.

Upon sensing the object, the flash device controller 208 controls the flash device 209 to flash with predetermined radiant quantities at least once (pre-radiating operation). The distance information detector 206 detects the distance information between the electronic camera and the object on the basis of the control signal outputted from the AF controller 205, and outputs the detected distance information to the photometry circuit selector 207.

The photometry circuit selector 207 selects either an output (photometric value) of the first photometry circuit 204a or an output (photometric value) of the second photometry circuit 204b on the basis of the inputted distance information. More specifically, when the distance to the object is shorter than a predetermined value, then the first photometry circuit 204a (in other words, a photometric value outputted from the first photometry circuit 204a) is selected, whereas, when equal or longer than the predetermined value, then the second photometry circuit 204b (in other words, a photometric value outputted from the second photometry circuit 204b) is selected. The flash device controller 208 controls radiant quantities of the flash device 209 so that the object is sensed with proper exposure using the photometric value of the selected photometry circuit.

In the second embodiment, the first photometry circuit 204a performs the center-weighted average photometry and the second photometry circuit 204b performs the peak photometry, as described above. Under the conditions that the distance to the object 301 (FIG. 3A) is long and the background image 302 is dark, when the amount of light reflected by the object 301 is less than a predetermined value, the center-weighted average photometry is greatly affected by the dark area around the object undesirably, and radiant quantities would not be controlled properly for illuminating the object to be sensed with proper exposure. Therefore, in this case, the photometric value obtained as a result of the peak photometry by the second photometry circuit 204b is selected.

When the reflectance of the main object 301 is roughly uniform in the corresponding divided areas, the photometric value of the area 305a is greater than that of the area 305b, and the photometric value of the area 305b is greater that that of the area 305c, since the area of the main object 301 in the respective divided areas 305a, 305b and 305c decrease in the described order, as shown in FIG. 3C. Further, since the portion of the area 305a occupied by the main object 301 is the greatest among the plurality of divided areas, and the amount of reflected light in the area 305a in the preradiating operation would be the greatest; therefore, the photometric value of the area 305a would be the maximum of all the photometric values. In this case, the second photometry circuit 204b outputs the photometric value of the area 305a.

Thus, by extracting the area of the main object corresponding to the maximum photometric value, it is possible to reduce effects of the dark peripheral areas around the main object, thereby it is possible to perform control of radiant quantities in high precision.

Whereas, when the distance to the object is short and radiant quantities are controlled on the basis of a photometric value outputted from the second photometry circuit 204b adopting the peak photometry in spite of a sufficient amount of light being reflected by the object in the pre-radiating operation, the object also can not be sensed with proper exposure. Accordingly, when it is determined that the object is near the electronic camera on the basis of the distance information provided from the distance information detector 206, the first photometry circuit 204a is selected and a photometric value obtained by performing the center-weighted average photometry is used for controlling radiant quantities of the flash device 209. Accordingly, it is possible to sense an object with proper exposure.

Figure 5:
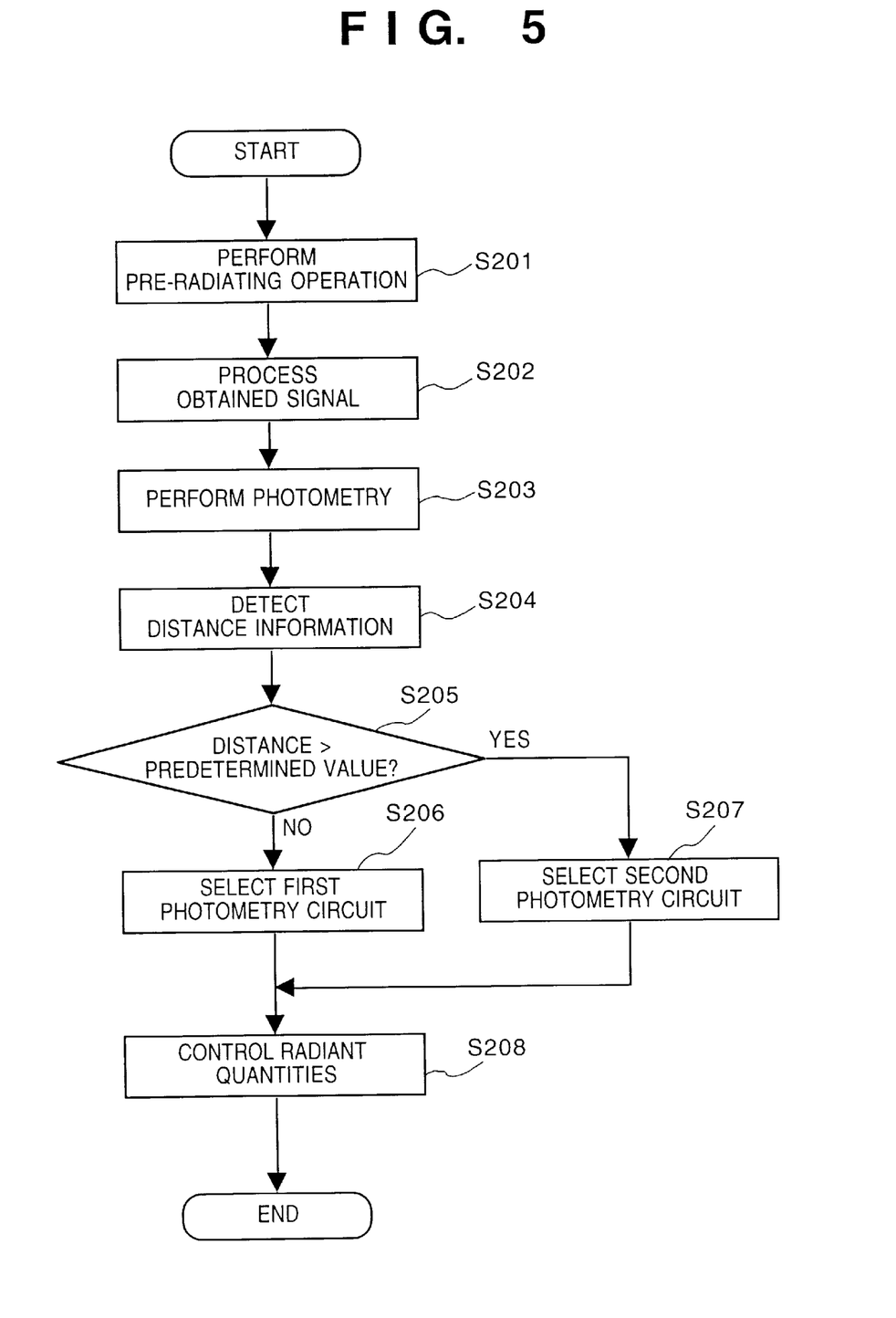
FIG. 5 is a flowchart showing a control operation of radiant quantities according to the second embodiment.

FIG. 5 is a flowchart showing operation of the second embodiment. The operation is performed by a CPU (not shown) in a controller of the electronic camera by executing a program stored in ROM (not shown).

First, a pre-radiating operation is performed by the flash device 209 in step S201, and image signals obtained by the image sensing device 202 as a result of the pre-radiating operation is processed by the signal processing circuit 203 in step S202 and a luminance signal is outputted to the first and second photometry circuits 204a and 204b. Then, on the basis of the inputted luminance signal, the first and second photometry circuits 204a and 204b output photometric values obtained by performing the respective methods in step S203.

Further, the distance information detector 206 detects distance information to the object in step S204, and the process proceeds to step S205 where whether or not the distance to the object is greater than a predetermined value is determined by the photometry circuit selector 207. If the distance is equal or less than the predetermined value (NO in step S205), then the process proceeds to step S206 where the first photometry circuit 204a is selected. Whereas, if the distance is greater than the predetermined value (YES in step S205), then the second photometry circuit 204b is selected in step S207. Thereafter, in step S208, the flash device controller 208 controls radiant quantities of the flash device 209 so that the object is sensed with proper exposure using the photometric value of the selected photometry circuit in step S208.

Note, the first photometry circuit 204a, the second photometry circuit 204b, the distance information detector 206, the photometry circuit selector 207, and the flash device controller 208 may be physically implemented, software implemented, or a combination thereof, as long as they have the functions as described above.

According to the second embodiment as described above, by changing photometry method, depending upon a distance from the image sensing device to an object, it is possible to properly control radiant quantities of a flash device and sense the object in proper exposure comparing to a configuration using only one photometry circuit.

<Third Embodiment>

Next, the third embodiment is explained with reference to drawings.

Figure 6:
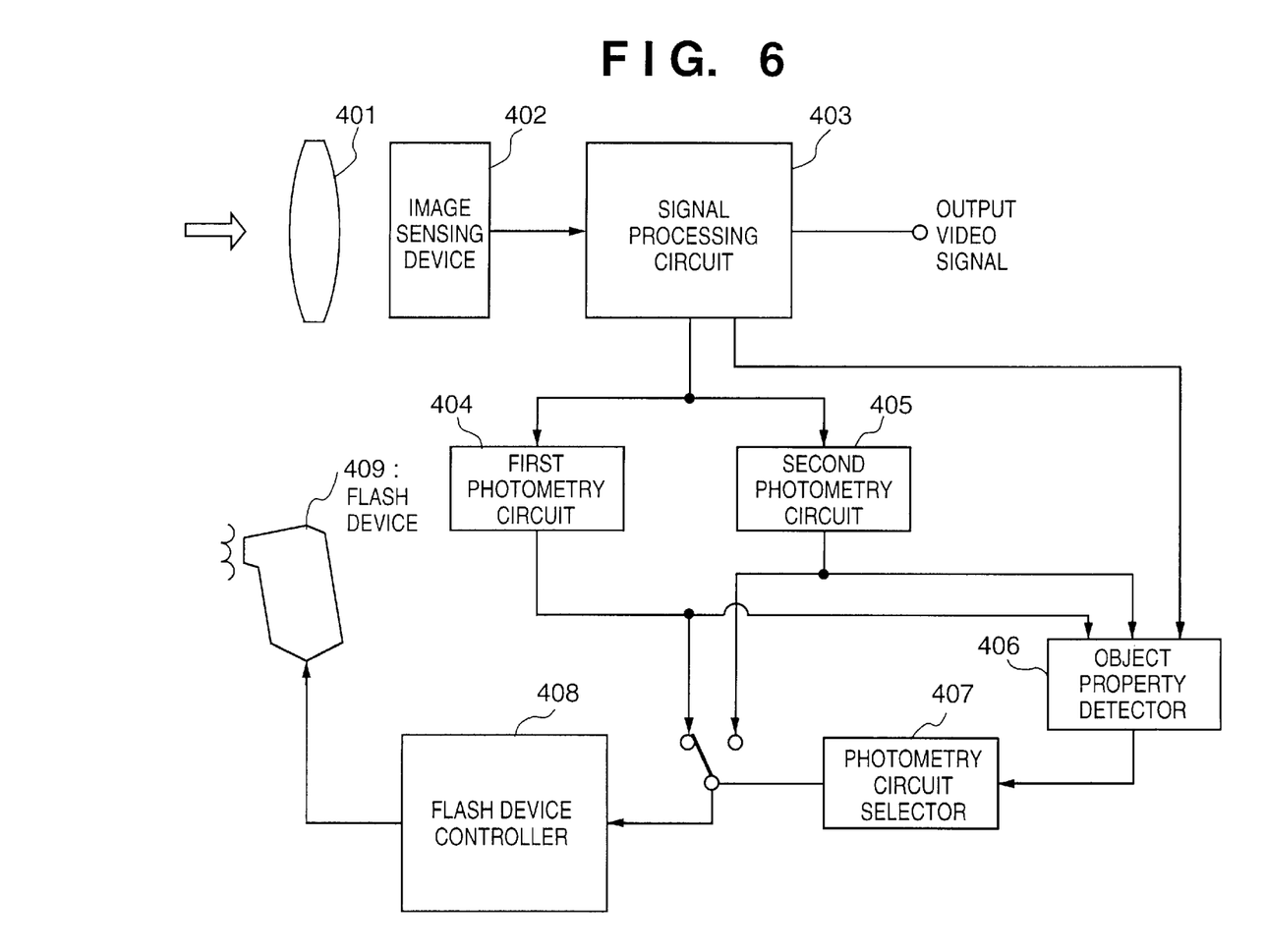
FIG. 6 is a block diagram illustrating a main configuration of an electronic camera having or capable of connecting to a flash device according to a third embodiment of the present invention.

FIG. 6 is a block diagram illustrating a main configuration of an electronic camera having or capable of connecting to a flash device according to the third embodiment of the present invention. In FIG. 6, reference numeral 401 denotes a focusing lens; 402, an image sensing device for converting incoming light into electric signals; 403, a signal processing circuit for generating information on luminance distribution of a scene as well as a luminance signal and color signals, from the electric signals generated by the image sensing device 402; 404, a first photometry circuit for generating a photometric value of the scene on the basis of the luminance signal generated by the signal processing circuit 403; 405, a second photometry circuit for generating a photometric value of the scene on the basis of the same luminance signal used by the first photometry circuit 404 by performing a different photometry method; 407, a photometry circuit selector for switching between the first photometry circuit 404 and the second photometry circuit 405; 406, an object property detector for detecting property of an object and outputting a detected result to the photometry circuit selector 407; 409, a flash device for illuminating the object; and 408, a flash device controller for controlling radiant quantities of the flash device 409 using the photometric value generated by either the first or second photometry circuit 404 or 405 selected by the photometry circuit selector 407.

In the electronic camera as described above, light from the object incidents on the image sensing device 402 via the lens 401 and applied with photoelectric conversion by the image sensing device 402, and a video signal is generated by the signal processing circuit 403. Further, the photometric values are generated by the first and second photometry circuits 404 and 405 on the basis of a luminance signal included in the video signal.

In the third embodiment, the first photometry circuit 404 outputs a photometric value obtained as a result of the center-weighted average photometry and the second photometry circuit 405 outputs a photometric value obtained by performing spot photometry on the central area 303 (FIG. 3B). The center-weighted average photometry and the central area is the same as those explained in the first embodiment.

Figure 7:
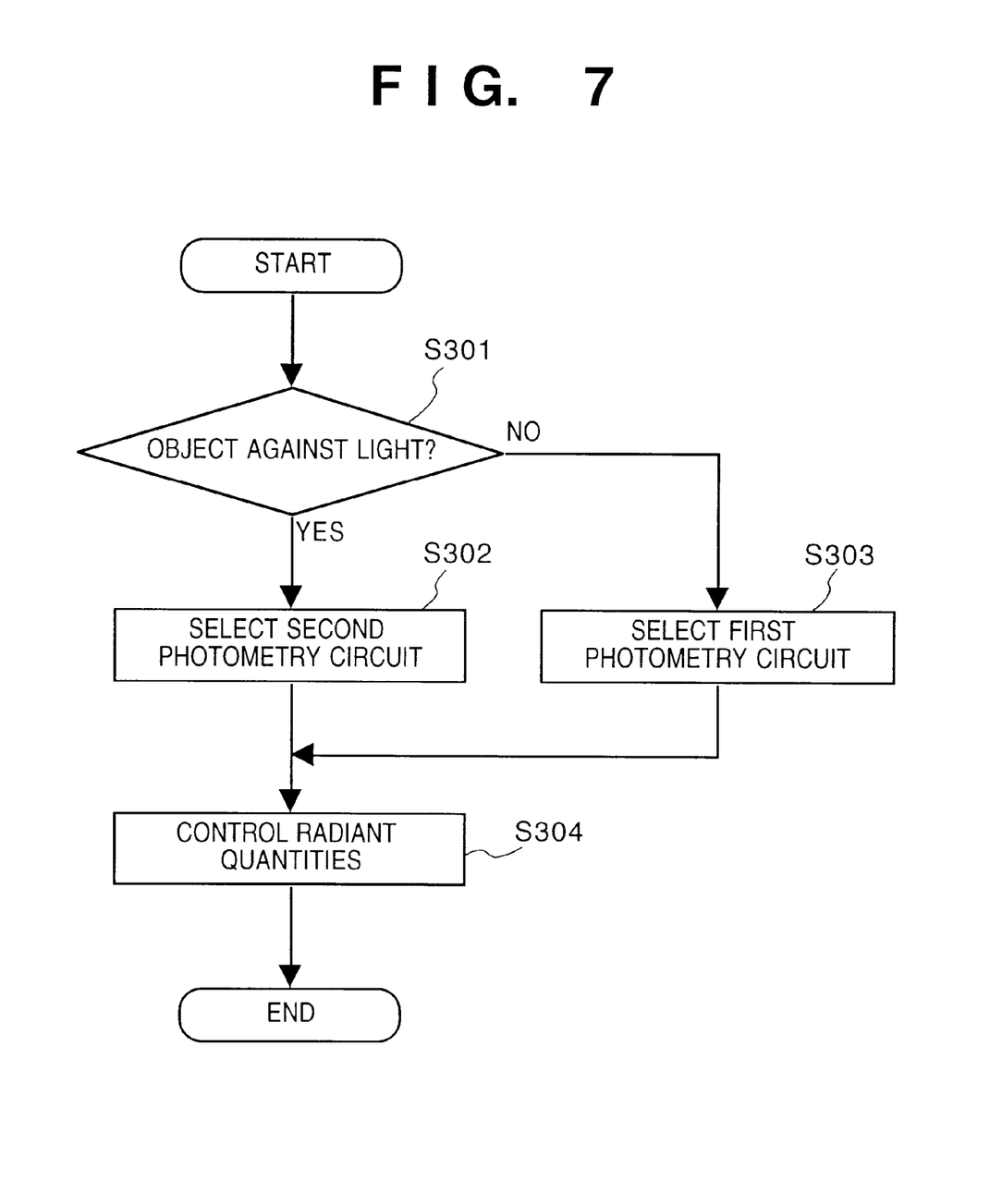
FIG. 7 is a flowchart showing a control operation of radiant quantities according to the third embodiment.

Next, operation for controlling radiant quantities in the third embodiment is explained with reference to a flowchart in FIG. 7.

When a main object is in the central area of a scene and is darker than a mean brightness of the scene, the main object is sensed against light (i.e., background is brighter than the object). In such a case, a photometric value obtained in the center-weighted average photometry is greatly affected by the bright area around the object undesirably, and radiant quantities would not be controlled properly for illuminating the object to be sensed with proper exposure. Accordingly, the object property detector 406 determines whether or not the object is against light from the information on the luminance distribution obtained by the signal processing circuit 403 in step S301, and if YES in step S301, then the photometry circuit selector 407 selects the second photometry circuit 405 which outputs a photometric value of the central area 303 in step S302. Since the photometric value outputted from the second photometry circuit 405 is not much affected by the bright area around the main object, it is possible for the flash device controller 408 to control radiant quantities properly to illuminate the object so as to be sensed with proper exposure in step S304.

Whereas, if the object property detector 406 determines in step S301 that the object is not against light from the information on the luminance distribution obtained by the signal processing circuit 403, then in step S303, the photometry circuit selector 407 selects the first photometry circuit 404 which outputs a photometric value obtained by performing the center-weighted average photometry. Since the object is not against light, it is possible for the flash device controller 408 to control radiant quantities properly for illuminating the object so as to be sensed with proper exposure in step S204 using the photometric value obtained in the center-weighted average photometry in step S304.

Note, the first photometry circuit 404, the second photometry circuit 405, the object property detector 406, the photometry circuit selector 407, and the flash device controller 408 may be physically implemented, software implemented, or a combination thereof, as long as they have the functions as described above.

According to the third embodiment as described above, by changing photometry method depending upon information on luminance distribution showing whether or not an object is against light, as property of an object, without performing pre-radiating operation, it is possible to properly control radiant quantities of a flash device and sense the object in proper exposure comparing to a configuration using only one photometry circuit.

Note, in the above explanation, the first photometry circuits 104, 204a and 404 in the first to third embodiments adopt the center-weighted average photometry, the second photometry circuits 105 and 204b in the first and second embodiments adopt the peak photometry, and the second photometry circuit 405 in the third embodiment adopts the spot photometry. However, the method of photometry is not limited to above, and any photometry method suitable for the foregoing utilization purpose may be used.

Further, in the first to third embodiments, configurations having two photometry circuits are explained; however, the number of photometry circuits is not limited to two. For example, by providing three photometry circuits which respectively perform the center-weighted photometry, the peak-photometry, and the spot photometry, radiant quantities may be controlled more properly depending upon various property of an object, such as a distance to the object and the object being against light, than the above first to third embodiments.

According to the present invention as described above, it is possible to sense an object while properly controlling radiant quantities of a flash device regardless of property of the object.

The present invention can be applied to a system constituted by a plurality of devices (e.g., host computer, interface, camera head) or to an apparatus comprising a single device (e.g., camera).

The present invention is not limited to the above embodiments and various changes and modifications can be made within the spirit and scope of the present invention. Therefore to apprise the public of the scope of the present invention, the following claims are made.

What is claimed is:

1. An image sensing apparatus having or capable of connecting to a flash device comprising:

an image sensing device for performing photoelectric conversion of light from an object and outputting an image signal to be used for photography;

a plurality of photometry means for obtaining and outputting photometric values using different photometry methods on the basis of the image signal outputted by said image sensing device;

property determination means for determining property of the object;

a selector for selecting one of said plurality of photometry means on the basis of the property of the object determined by said property determination means; and control means for controlling radiant quantities of said flash device on the basis of a photometric value outputted from the photometry means selected by said selector.

2. The image sensing apparatus according to claim 1, wherein said control means controls said flash device to flash with predetermined radiant quantities for obtaining the photometric values by said plurality of photometry means.

3. The image sensing apparatus according to claim 2, wherein said property determination means determines an amount of light reflected by the object illuminated by light of the predetermined radiant quantities.

4. The image sensing apparatus according to claim 3, wherein said plurality of photometry means include photometry means which performs center-weighted average photometry, and, when the quantity of light determined by said property determination means is greater than a predetermined value, said selector selects the photometry means which performs the center-weighted average photometry.

5. The image sensing apparatus according to claim 3, wherein said plurality of photometry means include photometry means which performs peak photometry, and, when the quantity of light determined by said property determination means is less than a predetermined value, said selector selects the photometry means which performs the peak photometry.

6. The image sensing apparatus according to claim 3, wherein said plurality of photometry means include photometry means which performs center-weighted average photometry and performs peak photometry, and, when the quantity of light determined by said property determination means is greater than a predetermined value, said selector selects the photometry means which performs the center-weighted average photometry, whereas when the quantity of light is equal or less than the predetermined value, said selector selects the photometry means which performs the peak photometry.

7. The image sensing apparatus according to claim 2, wherein said property determination means determines a distance to the object.

8. The image sensing apparatus according to claim 7, wherein said plurality of photometry means include photometry means which performs center-weighted average photometry, and, when the distance to the object determined by said property determination means is less than a predetermined value, said selector selects the photometry means which performs the center-weighted average photometry.

9. The image sensing apparatus according to claim 7, wherein said plurality of photometry means include photometry means which performs peak photometry, and, when the distance to the object determined by said property determination means is greater than a predetermined value, said selector selects the photometry means which performs the peak photometry.

10. The image sensing apparatus according to claim 7, wherein said plurality of photometry means include photometry means which performs center-weighted average photometry and performs peak photometry, and, when the distance to the object determined by said property determination means is equal or less than a predetermined value, said selector selects the photometry means which performs the center-weighted average photometry, whereas when the distance is greater than the predetermined value, said selector selects the photometry means which performs the peak photometry.

11. The image sensing apparatus according to claim 7, further comprising automatic focusing means for automatically focusing on the object and outputting focus control information,
wherein said property determination means determines the distance to the object on the basis of the focus control information outputted from said automatic focusing means.

12. The image sensing apparatus according to claim 1, wherein said property determination means determines whether or not the object is against light.

13. The image sensing apparatus according to claim 12, wherein said plurality of photometry means include photometry means which performs center-weighted average photometry, and, when said property determination means determines that the object is not against light, said selector selects the photometry means which performs the center-weighted average photometry.

14. The image sensing apparatus according to claim 12, wherein said plurality of photometry means include photometry means which performs spot photometry, and, when said property determination means determines that the object is against light, said selector selects the photometry means which performs the spot photometry.

15. The image sensing apparatus according to claim 12, wherein said plurality of photometry means include photometry means which performs center-weighted average photometry and performs spot photometry, and, when said property determination means determines that the object is not against light, said selector selects the photometry means which performs the center-weighted average photometry, whereas when the object is against light, said selector selects the photometry means which performs the peak photometry.

16. The image sensing apparatus according to claim 1, wherein said plurality of photometry means include photometry means which performs center-weighted average photometry, photometry means which performs peak photometry, and photometry means which performs spot photometry.

17. A control method for controlling an image sensing apparatus having or capable of connecting to a flash device, said method comprising:
an image sensing step of performing photoelectric conversion of light from an object and outputting an image signal to be use or photography;
a photometry step of obtaining and outputting a plurality of photometric values using a plurality of photometry methods on the basis of the image signal outputted in said image sensing step;
a property determination step of determining property of the object;
a selection step of selecting one of the plurality of photometric values outputted in said photometry step on the basis of the property of the object determined in said property determination step; and
a control step of controlling radiant quantities of said flash device on the basis of the photometric value selected in said selection step.

18. The control method according to claim 17, further comprising a pre-radiating step of causing said flash device to flash with predetermined radiant quantities for obtaining the photometric values in said photometry step.

19. The control method according to claim 18, wherein, in said property determination step, an amount of light reflected by the object illuminated by light of the predetermined radiant quantities is determined.

20. The control method according to claim 19, wherein said plurality of photometry methods include center-weighted average photometry, and, when the quantity of light determined in said property determination step is greater than a predetermined value, in said selection step, the photometric value obtained in the center-weighted average photometry is selected.

21. The control method according to claim 19, wherein said plurality of photometry methods include peak photometry, and, when the quantity of light determined in said property determination step is less than a predetermined value, in said selection step, the photometric value obtained in the peak photometry is selected.

22. The control method according to claim 19, wherein said plurality of photometry methods include center-weighted average photometry and peak photometry, and, when the quantity of light determined in said property determination step is greater than a predetermined value, said selection step selects the photometric value obtained in the center-weighted average photometry is selected, whereas when the quantity of light is equal or less than the predetermined value, in said selection step, the photometric value obtained in the peak photometry is selected.

23. The control method according to claim 18, wherein, in said property determination step, a distance to the object is determined.

24. The control method according to claim 23, wherein said plurality of photometry methods include center-weighted average photometry, and, when the distance to the object determined in said property determination step is less than a predetermined value, in said selection step, the photometric value obtained in the center-weighted average photometry is selected.

25. The control method according to claim 23, wherein said plurality of photometry methods include peak photometry, and, when the distance to the object determined in said property determination step is greater than a predetermined value, in said selection step, the photometric value obtained in the peak photometry is selected.

26. The control method according to claim 23, wherein said plurality of photometry methods include center-weighted average photometry and peak photometry, and, when the distance to the object determined in said property determination step is equal or less than a predetermined value, in said selection step, the photometric value obtained in the center-weighted average photometry is selected, whereas when the distance is greater than the predetermined value, in said selection step, the photometric value obtained in the peak photometry is selected.

27. The control method according to claim 23, further comprising an automatic focusing step of automatically focusing and outputting focus control information,
wherein, in said property determination step, the distance to the object is determined on the basis of the focus control information outputted in said automatic focusing step.

28. The control method according to claim 17, wherein, in said property determination step, whether or not the object is against light is determined.

29. The control method according to claim 28, wherein said plurality of photometry methods include center-weighted average photometry, and, when it is determined in said property determination step that the object is not against light, in said selection step, the photometric value obtained in the center-weighted average photometry is selected.

30. The control method according to claim 28, wherein said plurality of photometry methods include spot photometry, and, when it is determined in said property determination step that the object is against light, in said selection step, the photometric value obtained in the spot photometry is selected.

31. The control method according to claim 28, wherein said plurality of photometry methods include center-weighted average photometry and spot photometry, and, when it is determined in said property determination step that the object is not against light, in said selection step, the photometric value obtained in the center-weighted average photometry is selected, whereas when the object is against light, in said selection step, the photometry step which performs the peak photometry is selected.

32. The control method according to claim 17, wherein said plurality of photometry methods include center-weighted average photometry, peak photometry, and spot photometry.

33. An image sensing apparatus having or capable of connecting to a flash device comprising:

an image sensing device that performs photoelectric conversion of light from an object and outputs an image signal to be used for photography; and a control device that controls a flash photography by using the flash device in accordance with a photometry manner selected on the basis of the image signal from said image sensing device.

* * * * *